2,860,165

DIARYL DISULFONAMIDES AND PROCESSES FOR THEIR PRODUCTION

Ernst Schraufstätter, Wuppertal-Elberfeld, Germany, assignor to Schenley Industries, Inc., New York, N. Y., a corporation of Delaware No Drawing. Application January 19, 1955
Serial No. 482,885

Claims priority, application Germany January 25, 1954

5 Claims. (Cl. 260—556)

This invention relates to, and has as its object, the production of novel diaryl disulfonamides which have been found to be therapeutically useful compounds.

The diaryl disulfonamides of the present invention have the general formula:

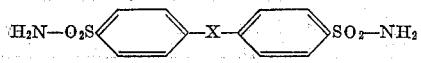

I in which X is a carbonyl, dicarbonyl (—CO—CO—) or a lower divalent alkyl radical having from 1 to 5 carbon atoms, such as methylene, dimethylmethylene, etc.

The diaryl disulfonamides in accordance with the invention show in highly diluted solutions a marked inhibitory effect upon carbonic anhydrase and are thus excellently suited for therapeutic use as mercury-free diuretics.

The diaryl disulfonamides of the invention may be obtained by reacting a diaryl sulfonylhalide of the formula:

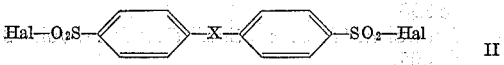

II in which X has the significance designated above and Hal is a halogen atom, with ammonia, ammonium salts, such as ammonium carbonates, or substances which engender ammonia under the conditions of the reaction.

The reaction temperature is not critical and any temperature below about 100° C. may be used though room temperature is preferred.

The starting diaryl sulfonyl halide may be obtained in accordance with various known methods, such as by direct sulfochlorination, as, for example, of diphenylmethane; by reacting alkali-metal salts of the corresponding disulfonic acids with acid halides; or by exchanging amino groups for sulfonic acid halide groups as set forth in German Patent 859,461. The process of the said German patent is particularly suitable for the production of benzophenone-4,4'-disulfonic acid halides and similar compounds from the corresponding 4,4'-diamino compounds.

Alternatively, the diaryl disulfonamides of the present invention may be obtained by contacting a diaryl sulfene amide having the formula:

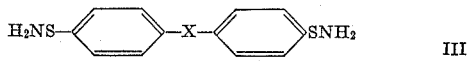

III in which X has the significance designated above, with oxidizing agents as, for example, with an acid solution of hydrogen peroxide or with an alkaline permanganate solution.

The starting diaryl sulfene amides may be obtained by direct halogenation of a di-mercaptan in an inert solvent and thereafter reacting the di-sulfene-chloride thus obtained with ammonia.

The following examples are given by way of illustration and not limitation:

EXAMPLE 1

Fifteen grams of diphenylmethane-4,4'-disulfonyl chloride (produced from diphenylmethane and chlorosulfonic acid as described in J. Am. Chem. Soc. 73, 1097 (1951)) are added while stirring and cooling to an aqueous solution of 25 grams of ammonium carbonate. The mixture is stirred for some time and then acidified with acetic acid. The precipitate, which is separated and then recrystallized from 25% methonol, is diphenylmethane-4,4'-disulfonamide, which melts at 184° C. The formula of the diaryl diphenylmethane-4,4'-disulfonamide corresponds to Formula I with X representing a methylene radical.

EXAMPLE 2

Twenty grams of benzophenone-4,4'-disulfonyl chloride (melting point 175° C.; produced by diazotizing 4,4'-diaminobenzophenone in glacial acetic acid and concentrated hydrochloric acid and then pouring the diazonium chloride solution into glacial acetic acid saturated with sulfur dioxide which also contains catalytic amounts of cuprous chloride), are added to a solution of 100 milliliters of concentrated ammonia in 100 milliliters of water while stirring and keeping the mixture lukewarm for one hour. The mixture is then acidified and suction filtered. The benzophenone-4,4'-disulfonamide thus separated is recrystallized from 50% ethanol, and has a melting point of 241° C. The formula of the benzophenone-4,4'-disulfonyl chloride corresponds to Formula II with X representing a carbonyl radical.

EXAMPLE 3

Four and eight-tenths grams of benzil-4,4'-disulfonyl chloride (melting point 171° C.; prepared from 4,4'-diamino benzil in the same manner as the benzophenone-4,4'-disulfonyl chloride in Example 2) are dissolved in 70 milliliters of dioxane. Four milliliters of concentrated aqueous ammonia are dropped into this solution, which is then heated for a short time. The solvent is distilled off in vacuo, and benzil-4,4'-disulfonamide is obtained by recrystallizing the residue from 50% ethanol. It melts at 238° C. with decomposition. The formula of the benzil-4,4'-disulfonyl chloride corresponds to Formula II with X representing the dicarbonyl radical: (—CO—CO—).

EXAMPLE 4

Fifteen grams of α,α-dimethyldiphenylmethane-4,4'-disulfonylchloride (melting point 166° C.; obtained in the same manner as the benzophenone-4,4'-disulfonyl chloride in Example 2, by diazotization of 4,4'-diamino-α,α-dimethyl-diphenylmethane, and subsequent treatment with sulfur dioxide in glacial acetic acid in the presence of cuprous chloride), are for a short period heated in 50 milliliters of aqueous ammonia. The reaction product is then acidified with acetic acid and the precipitate is separated and recrystallized from 50% ethanol. The α,α-dimethyldiphenylmethane-4,4'-disulfonamide thus obtained has a melting point of 223° C. The α,α-dimethyl-diphenylmethane-4,4'-disulfonylchloride has the formula

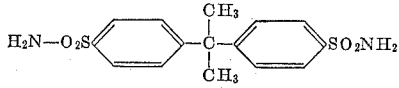

EXAMPLE 5

Ten grams of 4,4'-dimercaptodiphenylmethane (J. Am. Chem. Soc. 73, 1097) are dissolved in 100 milliliters of carbon tetrachloride and chlorine is introduced with stirring into the solution until a distinct odor of chlorine is perceptible. Thereupon the solvent is evaporated in vacuo yielding diphenylmethane-4,4'-disulfene-chloride having a melting point of 65° C., which is then dissolved in chloroform. Gaseous ammonia is introduced while cooling the chloroform solution with ice. When the reaction is completed, the solid reaction product is precipitated with petroleum ether, suction filtered and separated from ammonium chloride by digestion with water. The diphenylmethane-4,4'-disulfeneamide obtained begins to decompose at 125° C. when heated in a melting point tube. It is suspended in acetic acid and a 30% hydrogen peroxide solution is added. After standing overnight the reaction product is separated and recrystallized from dilute alcohol. The diphenylmethane-4,4'-disulfonamide thus obtained is identical with the product prepared in Example 1.

*Comparative tests*

In order to establish the therapeutic value of the new diaryl disulfonamides of the present invention, they were compared with a known carbonic anhydrase inhibitor described by Richard O. Roblin, Jr. and James W. Clapp in J. Am. Chem. Soc., 1950, vol. 72, No. 11, pp. 4890–4892, using the method described in J. Am. Chem. Soc., 1950, vol. 72, No. 11, pages 4893–6, by Wilbur H. Miller, Alice M. Dessert and Richard O. Roblin, Jr. The concentrations of the new diaryl disulfonamides and the concentration of the known 2-acetylamino-1,3,4-thiodiazo-5-sulfonamide (which is known as "Diamox), which produce a 50% inhibition of carbonic anhydrase were determined. The results are set forth in the following table:

| Compound | Concentration in gamma-millilieter producing a 50% inhibition of carbonic anhydrase |
|---|---|
| Diphenylmethane-4,4'-disulfonamide | 0.0021 |
| benzophenone-4.4'-disulfonamide | 0.0038 |
| benzil-4,4'-disulfonamide | 0.0025 |
| α,α-dimethyldiphenylmethane-4,4'-disulfonamide | 0.008 |
| For comparison: 2-acetylamino-1,3,4-thiodiazole-5-sulfonamide (Diamox) | 0.012 |

In vivo tests, the various diaryl disulfonamides described in Examples 1 through 4 were found to have high diuretic activity, which was greater than that of the known 2-acetylamino-1,3,4 thiodiazole-5-sulfonamide.

I claim:

1. As a chemical compound, a diaryl disulfonamide having the general formula:

in which X is a member selected from the group consisting of carbonyl, dicarbonyl and lower divalent alkyl radicals having from 1 to 5 carbon atoms.

2. As a chemical compound, benzophenone-4,4'-disulfonamide.

3. As a chemical compound, benzil-4,4'-disulfonamide.

4. As a chemical, α,α-dimethyldiphenylmethane-4,4'-disulfonamide.

5. As a chemical compound, diphenylmethane-4,4'-disulfonamide.

References Cited in the file of this patent

UNITED STATES PATENTS

| 2,349,912 | Orthner et al. | May 30, 1944 |
| 2,450,863 | Altamura | Oct. 5, 1948 |
| 2,640,853 | Sundholm | June 2, 1953 |
| 2,673,220 | Hunter | Mar. 23, 1954 |

FOREIGN PATENTS

| 901,006 | France | Oct. 23, 1944 |
| 553,269 | Great Britain | May 14, 1943 |

OTHER REFERENCES

Desha: Organic Chemistry, page 256 (1952), McGraw-Hill Book Co., Inc., New York.

Gabriel et al.: "Ber. deut. chem.," vol. 13, (1880), page 390.

Lapworth: "J. Chem. Soc." (London), vol. 73 (1898), page 405.